United States Patent [19]

Aine

[11] 3,739,553

[45] June 19, 1973

[54] EXHAUST EMISSION CONTROL MEANS FOR INTERNAL COMBUSTION APPARATUS

[76] Inventor: Harry E. Aine, 4008 Twyla Lane, Campbell, Calif. 95008

[22] Filed: June 14, 1971

[21] Appl. No.: 152,676

[52] U.S. Cl. .............. 55/158, 55/DIG. 30, 60/279, 210/321, 210/493
[51] Int. Cl............................................ B01d 13/00
[58] Field of Search .................... 60/278, 279, 297, 60/311; 123/119 A; 55/16, 158, DIG. 30; 23/277 C; 210/321, 493

[56] References Cited
UNITED STATES PATENTS

| | | | |
|---|---|---|---|
| 3,025,964 | 3/1962 | Summers | 210/493 |
| 3,458,977 | 8/1969 | Young | 210/493 |
| 2,597,907 | 5/1952 | Steiner | 55/158 |
| 2,966,235 | 12/1960 | Kammermeyer | 55/16 |
| 3,241,293 | 3/1966 | Pfefferle | 55/16 |
| 3,266,223 | 8/1966 | Dresser | 55/158 |
| 3,339,341 | 9/1967 | Maxwell | 55/16 |
| 3,401,798 | 9/1968 | Nyrop | 210/321 |
| 3,580,840 | 5/1971 | Uridil | 210/321 |
| 3,612,281 | 10/1971 | Leonard | 210/321 |

Primary Examiner—Douglas Hart
Attorney—Harry E. Aine and William J. Nolan

[57] ABSTRACT

An exhaust emission control means for removing smog producing constituents from the exhaust gases of an internal combustion chamber is disclosed which employs a membrane gas separator disposed in gas communication with the flow of exhaust gases at essentially atmospheric pressure. The gas separator causes unburned hydrocarbons and other smog producing constituents of the exhaust gas to go into solution with the membrane material, which is a barrier to permanent gases, and to diffuse from the membrane material into a stream of fresh air at substantially atmospheric pressure which is thence fed back to the combustion chamber or to an afterburner for completing the combustion of such smog producing constituents. A relatively large area of membrane material is provided in a relatively small volume by pleating or folding the membrane. Alternatively, a large area membrane is provided in a small volume by bonding together adjacent sheet portions of membrane in a certain pattern of bond lines to provide a honeycomb of alternating exhaust and fresh air gas passageways when the bonded structure is expanded.

2 Claims, 17 Drawing Figures

PATENTED JUN 19 1973 3,739,553
SHEET 1 OF 2
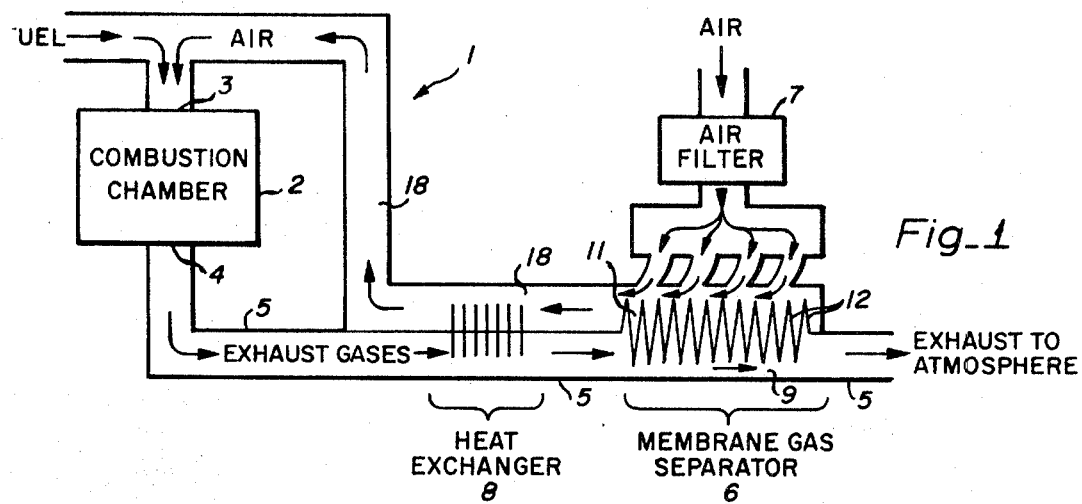
Fig_1
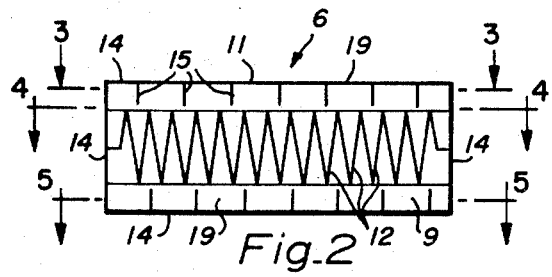
Fig_2
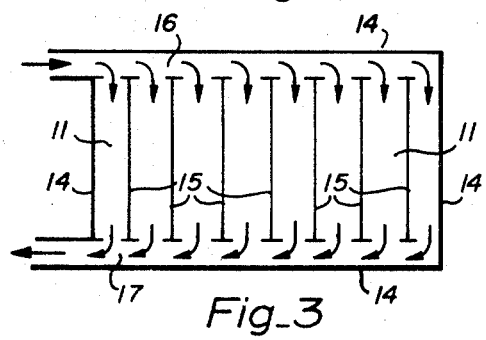
Fig_3
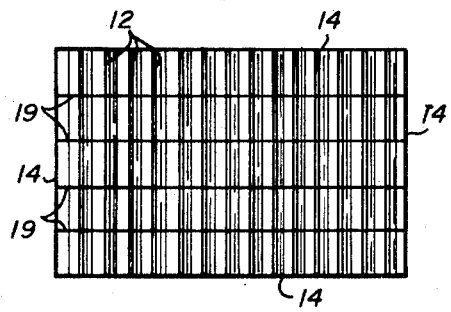
Fig_4
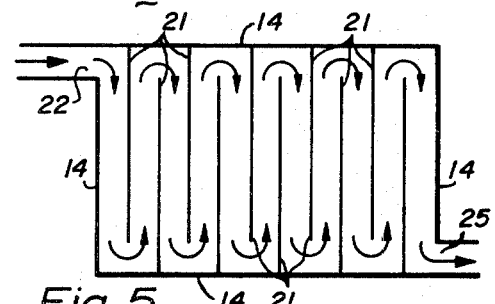
Fig_5
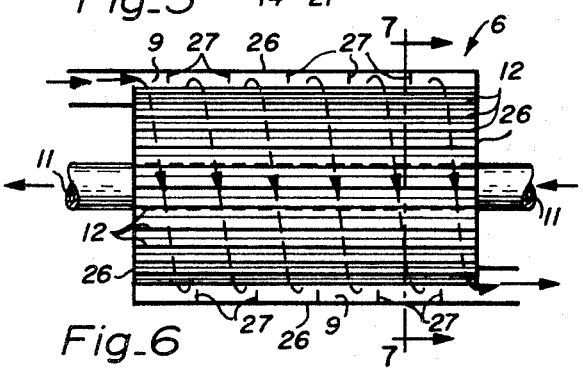
Fig_6
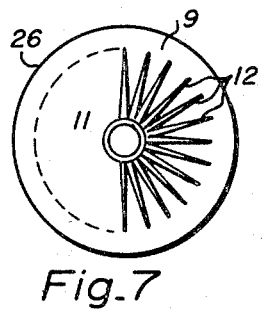
Fig_7
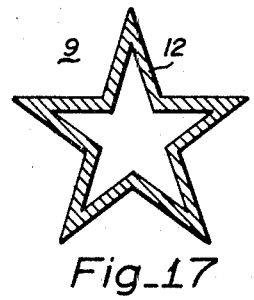
Fig_17
INVENTOR.
HARRY E. AINE
BY
ATTORNEY

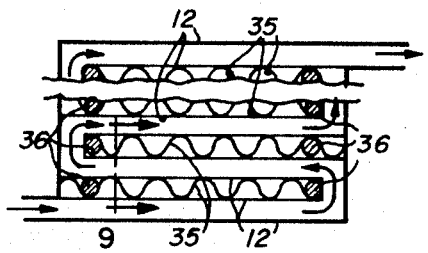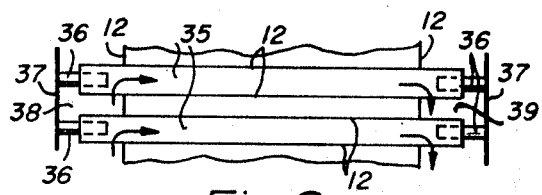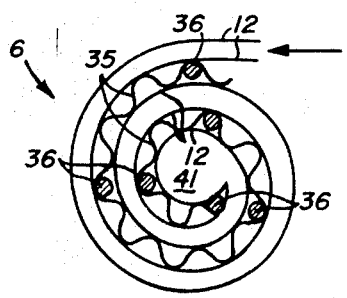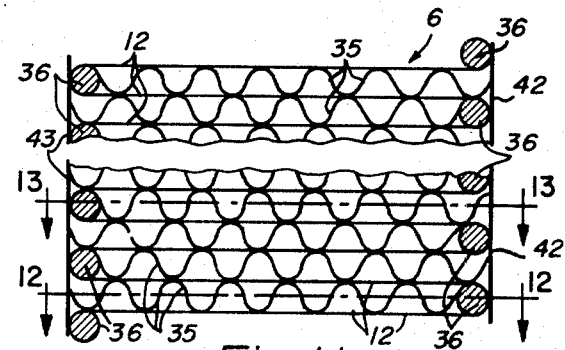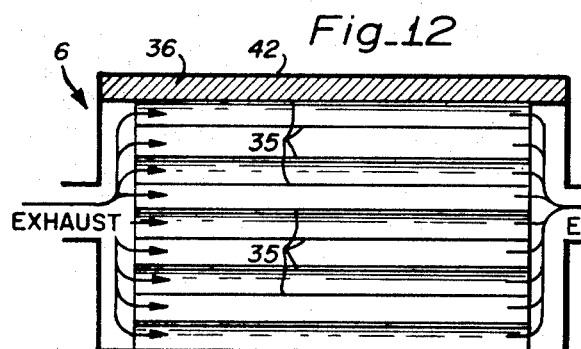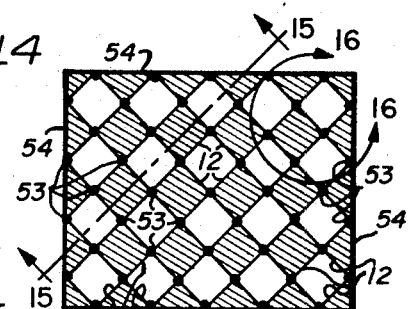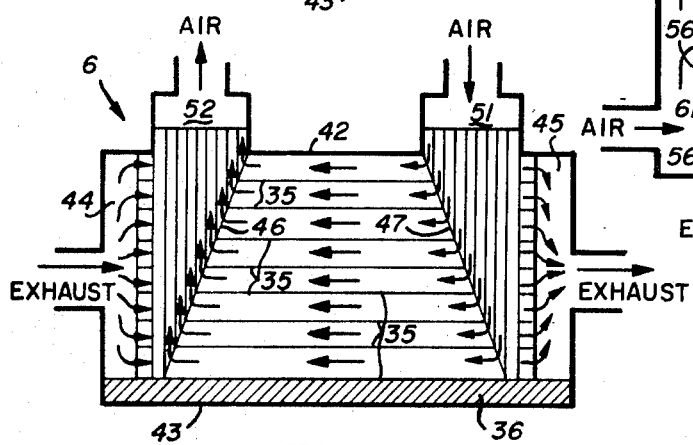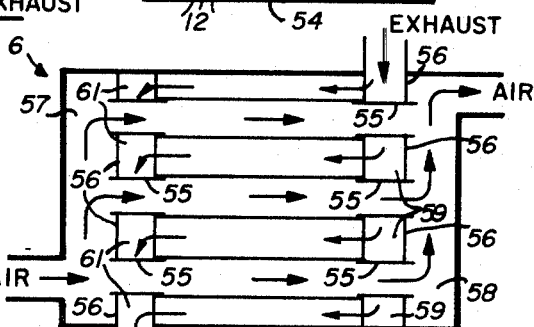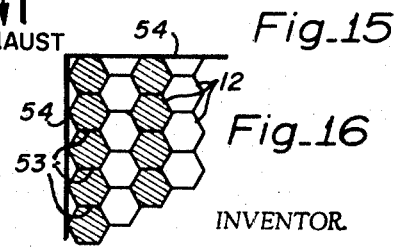

3,739,553

EXHAUST EMISSION CONTROL MEANS FOR INTERNAL COMBUSTION APPARATUS

DESCRIPTION OF THE PRIOR ART

Heretofore, exhaust emission control devices have been proposed wherein the exhaust gases from an internal combustion engine have been fed through a centrifugal separator for separating the heavy constituents of the exhaust from the lighter constituents. The lighter constituents were recycled to the engine and utilized therein, whereas the heavier constituents were disposed of. Such a prior art teaching is disclosed in U.S. Pat. No. 2,147,670 issued Feb. 21. 1939.

In another prior art method for cleaning engine exhaust gases, the exhaust gases of an internal combustion engine were fed through a scrubber unit which was packed with a fibrous or spherical body packing material over which raw fuel was sprayed and gravitated in a flow contra to the flow of exhaust gases through such packing material. The raw fuel picked up unburned hydrocarbons and thereby scrubbed the exhaust gases. The raw fuel was collected at the bottom of the scrubber and fed to the combustion chamber for burning. Such a prior art method is disclosed in U.S. Pat. No. 3,100,376 issued Aug. 13, 1963.

It is also known from the prior art that a membrane gas separator may be utilized for separating condensable gaseous hydrocarbons from permanent gases by flowing the gas stream containing the hydrocarbons over one face of a membrane which is made of a material which will take the hydrocarbons into solution. A total pressure differential is maintained across the membrane to allow the hydrocarbon gases to diffuse through the membrane to the opposite side while excluding permanent gases. Examples of such membrane gas separators for use in gas analyzer inlet systems for evacuated gas analyzers, such as mass spectrometers, etc., are disclosed in U.S. Pat. No. 3,455,092 issued July 15, 1969 and U.S. Pat. No. 3,429,105 issued Feb. 25, 1969.

Membrane gas separators have also been employed for reclaiming helium and $CO_2$ from methane gas as disclosed in U.S. Pat. No. 3,256,675 and for separating $CO_2$ from permanent gases by means of a silicone rubber membrane as disclosed in U.S. Pat. No. 2,966,235 issued Dec. 27, 1960. Both of these references maintained a substantial total pressure differential across the membrane.

SUMMARY OF THE PRESENT INVENTION

The principal object of the present invention is the provision of an improved exhaust emission control means for internal combustion devices.

In one feature of the present invention, the exhaust gases of a combustion chamber are fed through a membrane gas separator for separating smog producing gaseous constituents from the exhaust gas stream. The separated smog producing gaseous constituents are disposed of by combustion either by being fed back to the combustion chamber or by being fed to an afterburner.

In another feature of the present invention, the membrane gas separator includes a membrane made of a material which has a permeability for permanent gases which is substantially less than its permeability for smog producing gaseous constituents.

In another feature of the present invention, the membrane gas separator includes a membrane made of a material selected from the group consisting of polymers and stationary liquid phases.

In another feature of the present invention, the membrane strudture of the gas separator incudes a perforated support structure mounted in supportive engagement with the membrane for supporting the membrane.

In another feature of the present invention, the membrane gas separator is pleated to provide a large area of membrane in contact with the exhaust gases for increasing the rate of transfer of smog producing constituents across the membrane of the gas separator.

In another feature of the present invention, a heat exchanger is disposed in heat exchanging relation with the flow of the exhaust stream upstream of the gas separator for cooling the exhaust gases fed to the gas separator.

In another feature of the present invention, the membrane gas separator includes a membrane made of silicone rubber.

In another feature of the present invention, a narrow tubular membrane or a pair of closely spaced membrane sheets are wound or folded together with a relatively narrow spacing between adjacent turns or folds to provide two systems of adjacent gas passageways separated by the membrane.

In another feature of the present invention, a membrane is stacked or folded and adjacent membrane portions are bonded together in accordance with a predetermined bond line pattern such that when the structure is expanded it forms a honeycomb array of adjacent gas passageways separated by the membrane. Two gas manifold systems are connected into the array of gas passageways for providing two adjacent systems of gas passageways separated by the membrane material.

In another feature of the present invention, a single sheet of membrane material is folded and closed off on opposite sides to define two systems of gas passageways separated by the membrane material.

Other features and advantages of the present invention will become apparent upon a perusal of the following specification, taken in connection with the accompanying drawings, wherein:

BRIEF DESCRIPTION OF THE DRAWINGS

FIG. 1 is a schematic line diagram, partly in block diagram form, of a combustion device incorporating an exhaust emission control means of the present invention, FIG. 2 is an enlarged longitudinal sectional view of the membrane gas separator portion of the structure of FIG. 1 delineated by line 2—2, FIG. 3 is a schematic sectional view of the structure of FIG. 2 taken along line 3—3 in the direction of the arrows, FIG. 4 is a schematic sectional view of the structure of FIG. 2 taken along line 4—4 in the direction of the arrows, FIG. 5 is a schematic sectional view of the strudture of FIG. 2 taken along line 5—5 in the direction of the arrows, FIG. 6 is a schematic longitudinal sectional view of an alternative embodiment of the membrane gas separator of FIG. 1 delineated by line 6—6, FIG. 7 is a reduced sectional view of the structure of FIG. 6 taken along line 7—7 in the direction of the arrows, FIG. 8 is a schematic cross-sectional view of an alternative embodiment of the present invention, FIG. 9 is a sectional view of the structure of FIG. 8 taken along line 9—9 in the direction of the arrows, FIG. 10 is a view similar to that of FIG. 8 depicting an alternative embodiment of the present invention, FIG. 11 is a view similar to that of FIG. 8 depicitng another embodiment of the present invention, FIG. 12 is a sectional view of the strcture of FIG. 11 taken along line 12—12 in the direction of the arrows, FIG. 13 is a sectional view of the structure of FIG. 11 taken along line 13—13 in the direction of the arrows, FIG. 14 is a view similar to that of FIG. 8 depicting an alternative embodiment of the present invention, FIG. 15 is a sectional view of the structure of FIG. 14 taken along line 15—15 in the direction of the arrows, FIG. 16 is a fragmentary sectional view of a portion of the structure of FIG. 14 delineated by line 16—16 and depicting an alternative embodiment of the present invention, and FIG. 17 is a sectional view of a porous tube coated with membrane material for defining an alternate embodiment of the present invention.

DESCRIPTION OF THE PREFERRED EMBODIMENTS

Referring now to FIG. 1, there is shown an internal combustion device 1 incorporating an exhaust emission control means of the present invention. More particularly, an internal combustion chamber 2 is supplied with air and fuel via input port 3 for combustion within the combustion chamber 2. The combustion chamber may comprise, for example, one or more of the internal combustion chambers of, an automotive engine, a jet engine, a furnace, an incinerator, or the like. The combustion products are exhausted from the combustion chamber 2 via an output port 4 and vented to the atmosphere via the intermediary of an exhaust pipe 5.

A membrane gas separator 6 is connected in stream with the flow of exhaust gases thruogh the exhaust pipe 5 for separating certain undesired smog producing gaseous combustion product constiuents of the exhaust gases. More particularly, the exhaust gases of the typical internal combustion engine include, aside from nitrogen, carbon dioxide, and carbon monoxide, numerous unburned hydrocarbons including, methane, ethane, ethylene, acetylene, propane, propylene, isobutane, $C_4$ olefins, isopentane, n-pentane, 2-methylpentane, 2,3-dimethylbutane, 3-methylpentane, n-hexane, 1-hexene, methylcyclopentane, 2-methylhexane, 2,3-dimethylpentane, benzene, 3-heptene, and 3-methyl-2-hexene.

The amount and proportion of the various unburned hydrocarbons vary with the operation of the autombile. For example, when the automobile is idling, the total unburned hydrocarbons may comprise, for example, 1,815 parts per million by volume. When the automobile is accelerating to 30 miles per hour, the total unburned hydrocarbons may comprise only 670 parts per million. When crusing at 30 miles per hour, the unburned hydrocarbons account for approximately 919 parts per million, whereas while the automobile is decelerating from 30 miles per hour the amount of unburned hydrocarbons vastly increases to 6,534 parts per million. According to current theory, hydrocarbons photochemically react in the atmosphere to form objectionable air pollutants.

Many of the unburned hydrocarbon constituents of the exhaust gas such as, $C_5$, $C_6$, $C_7$, and $C_8$ hydrocarbons are readily removed from the exhaust gases by means of the membrane gas separator 6. These separated unburned hydrocarbons are transferred into the filtered input fresh air stream to the combustion chamber 2. The input fresh air is filtered by a mechanical filter 7 to remove particulate matter which may tend to clog or obstruct operation of the membrane. The transferred unburned hydrocarbons are fed with input air stream to the combustion chamber 2 for burning therein. As an alternative, the separated unburned hydrocarbons may be eliminated or disposed of by being fed to an afterburner, not shown.

A heat exchanger 8, which may comprise a multitude of thermally conductive fins projecting into both the exhaust stream and the input air stream to the combustion chamber, serves to reduce the temperature of the exhaust gases as fed to the membrane gas separator 6. In a typical example, the membrane gas separator 6 is preferably operated at an operating temperature below 400°C and preferably approximately 250°C. The heat exchanger 8 is required only as necessary to reduce the operating temperature of the separator 6 to a temperature within its operating range.

The membrane gas separator 6 includes an exhaust chamber 9 through which the exhaust gases are fed and a separator chamber 11 into which the separated gaseous constituents are fed. Chambers 9 and 11 are separated by means of a membrane separator 12. The separator chamber 11 preferably has an input port and an output port for passing an air stream therethrough to pick up the separated gaseous constituents and to carry such constituents to the combustion chamber 2. As an alternative, not shown, the separator chamber 11 need only have an exhaust port which is evacuated by means of a pump which then pumps the gases removed from the separator chamber 11 to the combustion chamber 2 for burning.

The effectiveness of membrane 12 in separating unburned hydrocarbons and certain other materials such as $N_2O$, $CO_2$, $NO_2$ and $SO_2$ from other and permanent gas constituents of the exhaust gases, such as $N_2$, CO, $O_2$ and NO, is influenced by the material of the membrane, the thickness of the membrane, the temperature of the membrane, and the area of the membrane.

Suitable membrane materials are those materials selected from the class consisting of polymers and stationary liquid phases, where the term "stationary liquid phase" is used in the same sense as that employed for partitioning of gases in gas chromatography. In those instances where a truly liquid stationary liquid phase forms the membrane 12, a suitable reservoir supporting structure must be provided. For example, a reservoir constructed from a porous glass membrane or a fine screen mesh which is capable of supporting the liquid membrane by surface tension would be suitable. The membrane 12 operates by causing the organic vapors to go into solution with the membrane material. The dissolved gas diffuses through the membrane 12. Permanent gases do not condense on the membrane 12. As utilized herein, entering into solution is defined as a process of condensation and then mixing of the gaseous material in the surface layers of the membrane 12. (See Physics and Chemistry of the Organic Solid State, edited by David Fox, Mortimer M. Labes and Arnold Weissberger, published by Interscience Publishers, New York, 1965, Volume 2, page 517.) Stationary liquid phases are those liquid material employed in chromatographic columns to partition materials to be separated. Comprehensive lists of such membrane materials can be found in numerous publications, one being "Gas Chromatography" by Ernst Bayer, published by Elsevier Publishing Company, New York, 1961, tables 2, 13 and 14.

The membrane 12 or barrier is typically thin and can be called a membrane. In a typical example, the membrane is constructed of an elastomer, namely silicone rubber, having a thickness between 0.001 inch and 0.0001 inch. The basic property of this membrane 12 is its action in the manner of a liquid phase. More particularly, the permanent gases having the unburned hydrocarbon or organic vapors entrained therein come into contact with the membrane 12. Partition takes place. The absorption energy for the permanent gases is so small that very little goes into solution. The permeability of the membrane 12 for a given gaseous constituent is determined by two quantities, the solubility and the diffusion rate for the given gaseous constituent. The product of these for the permanent gases is very small, even though diffusion for such gases can be very rapid. For the organic vapor, the large solubility results in a large permeability and so organic vapor is transmitted through membrane 12 readily to the opposite side.

For hydrocarbon gases in the range of $C_5$–$C_8$ the permeability factor is approximately 1,000 times greater than that for permanent gases such as nitrogen. $N_2O$ and $CO_2$ gases have a permeability factor of approximately 10 times that of the permanent gases, whereas $NO_2$ and $SO_2$ have permeability factors of approximately 50 times that of the permanent gases.

The permeability P of the membrane 12 for any given gas can be calculated from a knowledge of its diffusion rate and solubility. The relationship is $$P = S\ D\ A\ [(p_1 - P_2)/d]t$$

where $S$ is the solubility for the gas, $D$ is the diffusion rate for the given gas, $A$ is the area of the membrane, $P_1 - p_2$ is the partial pressure differential across the membrane for the particular gaseous constituent, $d$ is the thickness of the membrane and $t$ is the time.

Assuming a silicone rubber membrane 12 approximately 0.001 inch in thickness and a 4 liter internal combustion engine 2 operating at 3,000 rpm it is estimated that approximately 20 square meters of membrane 12 would be required to remove substantially all of the unburned hydrocarbons from the exhaust gases. Such a membrane may comprise merely the free standing silicone membrane 12 or the membrane may be supported by being coated onto a dacron web or cloth and folded in an accordian pleated geometry, as more fully disclosed below. For example, such a pleated geometry, having a period for each pleat of 10 times the thickness of the membrane, a depth of each pleat of approximately 5 inches, and a width of each pleat of 6 inches, and a length for the pleated geometry of approximately 2 feet, yields approximately 130 square yards of membrane material in contact with the exhaust gas flow.

Although the separation chamber 11 may be closed except for an exhaust port, such that a reduced pressure is drawn on the separation chamber 11 via a pump, not shown, for removing the separated gas, this geometry is not preferred because it complicates obtaining a proper support for a large area membrane. The preferred embodiment flows the air intake to the combustion chamber 2 through the separation chamber 11 of the membrane gas separator 6 and operates on the principle of a differential in the partial pressure of the gaseous constituents without a substantial difference in the total pressure across the membrane 12.

The concentration of the unburned hydrocarbons in the fresh air intake stream to the combustion chamber 2 will be at ambient levels, and therefore very low, whereas the unburned hydrocarbon concnetration in the exhaust stream can be on the order of thousands of parts per million. Thus, a very substantial partial pressure differential is established across the membrane 12 for the gaseous constituents of interest without the necessity of a total pressure differential thereacross.

Thus, the unburned hydrocarbons which go into solution with the membrane material and diffuse therethrough to the separation chamber 11 are transferred from the exhaust stream to the air intake stream to the combustion chamber 2, thereby greatly simplifying the support for the large area membrane 12 and allowing a relatively large area membrane to be placed within a relatively small volume.

Referring now to FIGS. 2–5 there is shown one physical realization for the membrane gas separator 6. More particularly, the membrane gas separator 6 includes a generally rectangular enclosure 14 having an upper gas separation chamber 11 partitioned from a lower gas input chamber 9 via the intermediary of a pleated gas separating membrane 12 as of silicone rubber 0.001 inch– 0.001 inch thick. An array of transversely directed baffles 18 are placed in the separation chamber 11 for directing the flow of fresh air across the membrane separator 12 in a plurality of parallel directed flow paths interconnecting an input manifold 16 and a collection manifold 17. The input distribution manifold 16 receives air from the air filter, directs this air flow across the membrane separator 12 to the collection manifold 17. The output air stream of the collection manifold 17, which now contains the unburned hydrocarbons is directed back to the combustion chamber 2 via intake pipe 18.

The membrane separator 12 is supported on a plurality of longitudinally directed rods or support members 19 (FIG. 4) which extend transversely to the direction of the pleats. The support rods 19 are positioned both above and below the membrane 12. In addition, in a preferred embodiment, an array of support wires or strings, as of 0.001 inch to 0.0001 inch diameter are positioned, with one wire, within each of the apexes of the pleats. The arrays of transverse wires on opposite sides of the pleated membrane are spring biased apart to retain the proper pleat shape and spacing in the presence of small total pressure differentials across the membrane 12.

The input exhaust gas chamber 9 (FIG. 5) includes a plurality of transversely directed inter-digitated baffles 21 which are arranged to cause the flow of exhaust gases to traverse a winding path back and forth over the membrane separator 12. Exhaust gases to be separated are fed to the chamber 9 via input port 22 and the exhaust gases, free of unburned hydrocarbons, are exhausted to the atmosphere via exhaust port 25.

Although, in the membrane gas separator construction of FIGS. 2–5, the separated gas flow has been arranged to flow transversely across the membrane 12 in a plurality of parallel paths such that fresh air is introduced all along the length of the membrane 12, this is not the only suitable air flow pattern. More particularly, in an alternative embodiment, the gas separator chamber 11 would have a baffle arrangement substantially the same as that provided for the exhaust gas chamber 9 with the flow of fresh air being in the opposite direction to that of the exhaust gases. However, if the flow of the fresh air stream is exactly parallel to the exhaust gas stream and the flow in both streams is equal then only a maximum of 50 percent of the unburned hydrocarbons may be transferred from the exhaust gas stream to the fresh air stream, assuming no total pressure drop across membrane 12.

Referring now to FIGS. 6 and 7 there is shown an alternative physical realization of the membrane gas separator 6. In this embodiment, the gas separating membrane 12 is folded into an accordian pleated geometry with the pleats running longitudinally of the membrane separator 6. The pleated membrane 12 is then formed into a cylinder so that the inside of the cylindrical pleated membrane 12 defines the separated gas chamber 11 and an annular region surrounding the outside of the membrane 12 forms the exhaust gas input chamber 9. The membrane 12 is sealed across the ends of a cylindrical envelope 26. Helical baffles 27 extend inwardly from the envelope 26 into the exhaust gas input chamber 9 causing the exhaust gases to spiral around the outside of the membrane separator 12 for increasing the time the exhaust gases are in contact with the membrane 12. Fresh air is directed through the center separated gas chamber 11 for removing the separated unburned hydrocarbons and for carrying same to the combustion chamber 2.

Referring now to FIGS. 8 and 9, there is shown an alternative physical realization of the relatively large area membrane separator 6. In this instance, the membrane 12 is formed into a long tubular geometry of narrow cross-section. More particularly, two sheets of membrane 12 are selaed at their edges and folded back and forth into a serpentine structure with adjacent folds of the tube being separated by means of a corrugated sheet separator 35 to define a multitude of tubular gas passageways orthogonally directed to the direction of gas flow through the folded tube.

A plurality of rods 36 are inserted into the ends of the corrugated members 35 such rods being supported from the end walls 37 of the separator 6 for assuring the proper positioning of the corrugated separators 35 relative to the folds of the tubular membrane 12. Gas inlet and outlet manifolds 38 and 39 are provided at opposite ends of the corrugated separator 35 in gas communication with the passageways defined within the corrugated separator 35.

The exhaust gases are directed through the folded tubular membrane 12. The fresh air intake to the combustion chamber flows through the corrugated separator structure 35. Alternatively, the exhaust gases may be directed through the corrugated structure 35 with the fresh air flow to the combustion chamber flowing through the folded tube 12.

Referring now to FIG. 10 there is shown a membrane gas separator structure 6 similar to that of FIGS. 8 and 9 with the exception that the tubular membrane 12, instead of being folded, is wound into a spiral configuration with the corrugated separator 35 disposed between adjacent turns of the tubular membrane 12. At the interior of the spiral, the tubular membrane 12 is placed in gas communication with a hollow tube 41 extending axially of the spiral wound tube 12. Axially directed rods 36 extend inwardly from the end walls of the separator 6 through the input and output manifolds 38 and 39 into the convolutions of the corrugated separator 35 to assure proper spacing of adjacent turns of the separator structure 35 and tube 12.

Referring now to FIGS. 11-13, there is shown an alternative physical realization for the membrane separator 6 incorporating features of the present invention. The structure is similar to that of FIGS. 8 and 9 with the exception that the membrane 12 comprises merely a single membrane sheet folded back and forth on itself with the longitudinal side edges of the folded membrane being sealed in a gas tight manner to the longitudinal side walls 42 and 43 of the separator 6. In this manner, a multi-layer separator structure is obtained similar to that of FIGS. 8 and 9 with the exception that the corrugated separators 35 are positioned between each fold of the membrane 12 to provide two systems of parallel tubular gas passageways extending lengthwise of the separator 6.

Alternate layers of the partitioned folds are connected together via input and output manifolds 44 and 45 into the exhaust gas stream to form one system of gas passageways which includes every other layer of the folded membrane structure. The second system of gas passageways includes the alternate set of layers of the folded membrane 12. However, in this case, the corrugated partitions 35 are beveled at opposite ends 46 and 47 to mate with similarly beveled ends of transversely directed corrugated partitioning members 48 and 49 to form miter joints therebetween. The partitioning members 48 and 49 extend through apertures in the sidewall 42 of the separator 6 to respective input and output manifolds 51 and 52 connected in series with the air stream to the combustion chamber.

Referring now to FIGS. 14 and 15, there is shown an alternative physical realization of the membrane gas separator 6. In this embodiment, a single membrane sheet 12 is folded back and forth on its self or cut into sections and stacked. Adjacent layers of the stack are printed with bond lines 53 of adhesive extending across the width of the sheet 12. The bond lines 53 between adjacent pairs of layers are staggered such that when the sheets are bonded together at the bond lines 53 and the structure is expanded, as by pulling from the top and bottom of the stack, the structure expands to form a honeycomb structure, as shown in FIG. 14. Each of the honeycomb tubular members is of generally a four sided configuration. The outside edges of the honeycomb are bonded to the side walls 54 of the gas separator 6.

An array of tubular members 55 as of metal or glass, are inserted into alternate tubular passageways in the honeycomb structure as indicated by the unshaded squares of FIG. 14 for manifolding the honeycomb structure. The manifolding tubes 55 are conveniently inserted into the honeycomb structure by pressurizing the honeycomb structure to cause it to expand in size, and then inserting the tubes 55 from opposite ends into the honeycomb and reducing the pressure to allow the individual tubular portions of the honeycomb to collapse upon and grip the outside of the tubes 55. An adhesive is preferably provided around the outside of the tubes 55 as inserted into the honeycomb structure for bonding the honeycomb material to the manifold tubes 55.

The outside ends of the manifold tubes 55 are sealed through apertures in baffle plates 56 at opposite ends of the honeycomb to define input and output fresh air manifolds 57 and 58 at opposite ends of the gas separator structure 6. The exhaust input and output manifolds 59 and 61 are defined by the spaces between the baffle plates 56 and the opposite ends of the honeycomb structure.

The honeycomb structure of FIGS. 14 and 15 is preferably oriented such that the tubular portions of the honeycomb extend in the vertical direction. The exhaust gas stream is preferably directed through the inside manifold chambers 59 and 61 such that the tubular manifolding members 55 do not tend to constrict the flow of exhaust gases through the tubular portions of the honeycomb. In this manner, carbon particles and the like which may tend to collect within the exhaust gas channels of the honeycomb can drop through the structure to the collection manifold 61.

In a typical embodiment of the honeycomb structure of FIGS. 14 and 15, a honeycomb which is 5 inches deep, in the direction of gas flow, 16 inches wide and 3 feet long will provide approximately 20 square yards of gas separator membrane 12 when the tubular portions of the honeycomb are of rectangular cross-section and approximately one-fourth inch on the diagonal. If the diagonal dimension is reduced to one-eighth inch, approximately 40 square yards of membrane material will be incorporated in the same volume.

Referring now to FIG. 16, there is shown an alternative embodiment to the structure of FIGS. 14 and 15 wherein the adhesive bond line patterns are arranged such as to produce a honeycomb wherein the tubular portions are of hexagonal cross section.

An advantage of the multi-layered membrane configurations with systems of elongated parallel tubular gas passageways is that the effect of a tear or break in the membrane is localized such that the overall performance of the gas separator 6 is not appreciably impaired.

Although the large area membrane separator configurations of FIGS. 2–16 have been disclosed for use in separating smog producing constituents from the flow of exhaust gases from a combustion chamber, these configurations are useful in general for gas separation. The separated gases need only be collected and disposed of, as by absorption in a molecular sieve material disposed on the separated gas collection side of the membrane. In such a case the membrane serves as a selector for selectively separating certain gases for application to the molecular sieve material. Suitable molecular sieve materials include activated carbon and other well known gas absorbing materials.

Although preferred embodiments of the present invention utilize either folded, pleated, or honeycomb membrane geometries, other membrane geometries having a relatively large surface area may be utilized. For example, a multitude of hollow porous pipes, as of glass, may be coated on their exterior surface with a very thin film of membrane material and the glass pipes may extend into or through the flow of exhaust gases. The tubes have their interiors connected in gas communication with a collection manifold 17 or with input and output manifolds 16 and 17 for passing the fresh air intake stream therethrough for transfer of the unburned hydrocarbons from the exhaust gas stream to the fresh air stream. Such tubes may have a star or fluted cross sectional configuration as shown in FIG. 17, for increasing the surface area of the membrane exposed to the exhaust gases.

An advantage to the membrane separator configurations of FIGS. 2–16 is that the membrane 12 is relatively soft, to absorb sounds and vibrations in the exhaust gas flow, such that the membrane gas separator 6 also serves as a muffler for muffling the exhaust noises. Also the vibration and sound absorbed by the membrane structure 12 will tend to break loose collections of carbon material on the membrane 12, in the manner of a deicing boot.

If the exhaust gases contain a substantial amount of particulate matter which may tend to coat the membrane 12, a suitable filter may be placed up stream of the membrane separator in the exhaust pipe 5 for removing such particulate matter.

What is claimed is:

1. In a membrane fluid separator:
   membrane means formed into a multi-layer structure having first and second systems of adjacent fluid passageways, said adjacent systems of fluid passageways being separated from each other by a web of membrane material;
   first fluid manifold means for connecting said first system of said passageways in fluid communication with a fluid stream containing fluid to be separated therefrom for contacting a first side of said membrane with the fluid to be separated;
   fluid collecting means in fluid communication with the second side of said membrane means for collecting the separated fluid constituent;
   exhaust passage means for removing the remaining portion of said fluid stream from said first system;
   said multi-layer membrane structure comprising a honeycomb structure for defining a multitude of parallel tubular passageways of said first and second system of fluid passageways, and wherein adjacent layers of said membrane structure are bonded toegether in a certain pattern of bond lines, and the bonded structure being expanded to form said honeycomb structure.

2. The apparatus of claim 1 including, an array of tubular members projecting into opposite ends of one of said systems of fluid passageways for manifolding said system of fluid passageways.

* * * * *

PO-1050
(5/69)

UNITED STATES PATENT OFFICE
CERTIFICATE OF CORRECTION

Patent No. 3,739,553          Dated June 19, 1973

Inventor(s) Harry E. Aine

It is certified that error appears in the above-identified patent and that said Letters Patent are hereby corrected as shown below:

Insert following paragraph with heading on page 1, line 29:

-- RELATED CASES

The subject matter of Figs. 14-16 is claimed herein; the remaining subject matter of this application is claimed in my copending divisional application U.S. Serial No. 360,800 filed May 16, 1973. --

Signed and sealed this 2nd day of July 1974.

(SEAL)
Attest:

EDWARD M. FLETCHER, JR.          C. MARSHALL DANN
Attesting Officer                Commissioner of Patents